(12) United States Patent
Liu

(10) Patent No.: US 10,872,303 B2
(45) Date of Patent: *Dec. 22, 2020

(54) GENERATING SEMANTIC REPRESENTATIONS FOR ORGANIZATIONS AND COMPUTING PEER ORGANIZATION GROUPS

(71) Applicant: Microsoft Technology Licensing, LLC, Redmond, WA (US)

(72) Inventor: Yiqun Liu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/994,148

(22) Filed: May 31, 2018

(65) Prior Publication Data
US 2019/0370707 A1    Dec. 5, 2019

(51) Int. Cl.
G06Q 10/06 (2012.01)
G06K 9/62 (2006.01)
H04L 29/06 (2006.01)

(52) U.S. Cl.
CPC ......... *G06Q 10/067* (2013.01); *G06K 9/6223* (2013.01); *H04L 63/0421* (2013.01)

(58) Field of Classification Search
None
See application file for complete search history.

(56) References Cited

U.S. PATENT DOCUMENTS

| | | |
|---|---|---|
| 6,741,993 B1 | 5/2004 | Zitaner et al. |
| 8,050,959 B1 | 11/2011 | Erdman et al. |
| 9,146,939 B1 | 9/2015 | Zhdanovich et al. |
| 10,157,291 B1 * | 12/2018 | Kenthapadi ......... G06F 16/9017 |
| 2002/0091715 A1 | 7/2002 | Coady |
| 2005/0234879 A1 | 10/2005 | Zeng et al. |
| 2005/0234972 A1 | 10/2005 | Zeng et al. |
| 2005/0257148 A1 | 11/2005 | Goodman et al. |
| 2005/0261956 A1 * | 11/2005 | Kato ..................... G06Q 10/00 705/321 |

(Continued)

OTHER PUBLICATIONS

Iraqi, K. M., Yasin, H., & Yasin, M. M. (2015). Unearthing top 3 business strategies using data mining techniques. International Journal of Computer Applications, 118(22), n/a. doi:http://dx.doi.org/10.5120/20880-3630.*

(Continued)

*Primary Examiner* — Eric W Stamber
*Assistant Examiner* — George H Walker, III
(74) *Attorney, Agent, or Firm* — Schwegman Lundberg & Woessner, P.A.

(57) ABSTRACT

In an example embodiment, a confidential data architecture is extended by providing components for reliably inferring confidential data insights (e.g., median salary) for cohorts with little or no actual submitted confidential data. This is performed by inferring confidential data values based on organizations that are considered to be peers to the organization of interest. This solution involves two parts: the generation of a novel, semantic representation (embedding) of organizations to be used to compute a similarity measure between any two organizations, and the use of the semantic representation to compute a peer organization group of a given company.

20 Claims, 12 Drawing Sheets

(56) References Cited

U.S. PATENT DOCUMENTS

| | | | |
|---|---|---|---|
| 2007/0038602 A1 | 2/2007 | Weyand et al. | |
| 2007/0203720 A1* | 8/2007 | Singh | G06Q 10/063 705/7.11 |
| 2008/0201197 A1 | 8/2008 | Orttung et al. | |
| 2008/0243783 A1 | 10/2008 | Santi et al. | |
| 2011/0302162 A1 | 12/2011 | Xiao et al. | |
| 2014/0074555 A1 | 3/2014 | Tenhoeve et al. | |
| 2014/0244335 A1 | 8/2014 | Baldwin et al. | |
| 2014/0358809 A1* | 12/2014 | Gupta | G06Q 10/1053 705/321 |
| 2015/0095105 A1 | 4/2015 | Fitts | |
| 2015/0127565 A1 | 5/2015 | Chevalier et al. | |
| 2015/0128287 A1* | 5/2015 | LaFever | H04L 63/0407 726/27 |
| 2015/0193719 A1* | 7/2015 | Than | G06Q 10/105 705/7.39 |
| 2015/0278366 A1 | 10/2015 | Pilpel et al. | |
| 2015/0379445 A1 | 12/2015 | Wang et al. | |
| 2016/0026727 A1 | 1/2016 | Bar-yossef et al. | |
| 2016/0196511 A1 | 7/2016 | Anisingaraju et al. | |
| 2017/0116552 A1 | 4/2017 | Deodhar et al. | |
| 2018/0089196 A1* | 3/2018 | Kenthapadi | G06F 16/254 |
| 2019/0019116 A1* | 1/2019 | Haririnia | G06Q 30/018 |
| 2019/0080246 A1 | 3/2019 | Sun et al. | |
| 2019/0102710 A1* | 4/2019 | Predescu | G06F 16/335 |
| 2019/0102720 A1 | 4/2019 | Jennings et al. | |
| 2019/0114593 A1 | 4/2019 | Champaneria | |
| 2019/0294694 A1* | 9/2019 | Dash | G06N 20/00 |
| 2019/0370495 A1 | 12/2019 | Chen | |
| 2019/0370496 A1 | 12/2019 | Chen | |

OTHER PUBLICATIONS

"Non Final Office Action Issued in U.S. Appl. No. 15/907,476", dated Feb. 19, 2020, 17 Pages.

"Non Final Office Action Issued in U.S. Appl. No. 15/907,496", dated Feb. 14, 2020, 9 Pages.

"Non Final Office Action Issued in U.S. Appl. No. 15/908,467", dated Feb. 25, 2020, 21 Pages.

"Non Final Office Action Issued in U.S. Appl. No. 15/994,106", dated Feb. 24, 2020, 16 Pages.

"Classification", Retrieved from: https://web.archive.org/web/20180509224718/https://en.wikipedia.org/wiki/Classification, Published Date: May 9, 2018, 2 Pages.

"Cluster Analysis", Retrieved from: https://web.archive.org/web/20180503080731/https://en.wikipedia.org/wiki/Cluster_analysis, Published Date: May 3, 2018, 17 Pages.

"K-Means Clustering", Retrieved from: https://web.archive.org/web/20180413171048/https://en.wikipedia.org/wiki/K-means_clustering, Published Date: Apr. 13, 2018, 14 Pages.

"LU Decomposition", Retrieved from: https://web.archive.org/web/20180403215952/https://en.wikipedia.org/wiki/LU_decomposition, Published Date: Apr. 3, 2018, 11 Pages.

"Matrix Decomposition", Retrieved from: https://web.archive.org/web/20180713113607/https://en.wikipedia.org/wiki/Matrix_decomposition, Published Date: Jul. 13, 2018, 7 Pages.

"Singular Value Decomposition", Retrieved from: https://web.archive.org/web/20180502115918/https://en.wikipedia.org/wiki/Singular_value_decomposition, Date: May 2, 2018, 14 Pages.

Rasmussen, et al., "Gaussian Process for Machine Learning—Chapter 3", In the Book of Gaussian Process for Machine Learning, MIT Press, 2006, pp. 33-77.

* cited by examiner

| CONFIDENTIAL DATA 402 | MEMBER ID 404 | TIMESTAMP 406 | FIRST ATTRIBUTE 408 | SECOND ATTRIBUTE 410 |
|---|---|---|---|---|
| XXX | YYY | 5/31/16 04:15:15 | SAN FRANCISCO | SOFTWARE ENGINEER |
| XXX | YYY | 5/31/16 10:15:12 | LOS ANGELES | SOFTWARE ENGINEER |
| XXX | YYY | 6/1/16 01:12:12 | LOS ANGELES | PRODUCT MANAGER |
| XXX | YYY | 6/2/16 23:15:59 | DALLAS | VICE PRESIDENT, SALES |
| XXX | YYY | 6/3/16 05:43:12 | NEW YORK | HR BUSINESS PARTNER |

*FIG. 4*

| TRANSACTION ID 604 | CONFIDENTIAL DATA 606 |
|---|---|
| ZZZ | XXX |
| ZZZ | XXX |
| ZZZ | XXX |
| ZZZ | XXX |
| ZZZ | XXX |

600

| TRANSACTION ID 608 | MEMBER ID 610 | TIMESTAMP 612 | FIRST ATTRIBUTE 614 | SECOND ATTRIBUTE 616 |
|---|---|---|---|---|
| ZZZ | YYY | 5/31/16 04:15:15 | SAN FRANCISCO | SOFTWARE ENGINEER |
| ZZZ | YYY | 5/31/16 10:15:12 | LOS ANGELES | SOFTWARE ENGINEER |
| ZZZ | YYY | 6/1/16 01:12:12 | LOS ANGELES | PRODUCT MANAGER |
| ZZZ | YYY | 6/2/16 23:15:59 | DALLAS | VICE PRESIDENT, SALES |
| ZZZ | YYY | 6/3/16 05:43:12 | NEW YORK | HR BUSINESS PARTNER |

GENERATING SEMANTIC REPRESENTATIONS FOR ORGANIZATIONS AND COMPUTING PEER ORGANIZATION GROUPS

TECHNICAL FIELD

The present disclosure generally relates to computer technology for solving technical challenges in collection and maintenance of confidential data in a computer system. More specifically, the present disclosure relates to generating semantic representations for organizations to which the confidential data pertains and to computing peer organization groups.

BACKGROUND

In various types of computer systems, there may be a need to collect, maintain, and utilize confidential data. In some instances, users may be reluctant to share this confidential information due to privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a online service to request its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and is only used for specific purposes, and it can be difficult to convince members to provide such confidential information due to their concerns that these technical challenges may not be met.

Additionally, viewers of reports related to the confidential data (such as aggregated salary statistics) are often interested in gaining insights on the confidential data at the organization (e.g., company) level. This, however, can be challenging in environments where there is not enough confidential data at the organization level to provide meaningful insights, such as in the case of small or medium sized organizations or in cohorts where a large organization only has a small presence in a location or title of interest (e.g., Microsoft jobs in Indianapolis or jobs as a construction worker for Google).

BRIEF DESCRIPTION OF THE DRAWINGS

Some embodiments of the technology are illustrated, by way of example and not limitation, in the figures of the accompanying drawings.

FIG. 4 is a diagram illustrating an example of a submission table, in accordance with an example embodiment.

FIG. 6 is a diagram illustrating an example of a first submission table and a second submission table, in accordance with an example embodiment.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner while ensuring that the confidential information is accurate and reliable.

Furthermore, in an example embodiment, the architecture is extended by providing components for reliably inferring confidential data insights (e.g., average salary) for cohorts with little or no actual submitted confidential data. This is performed by inferring confidential data values based on organizations that are considered to be peers to the organization of interest. This solution involves two parts: the generation of a novel, semantic representation (embedding) of organizations to be used to compute a similarity measure between any two organizations, and the use of the semantic representation to compute a peer organization group of a given company.

Figure 1:
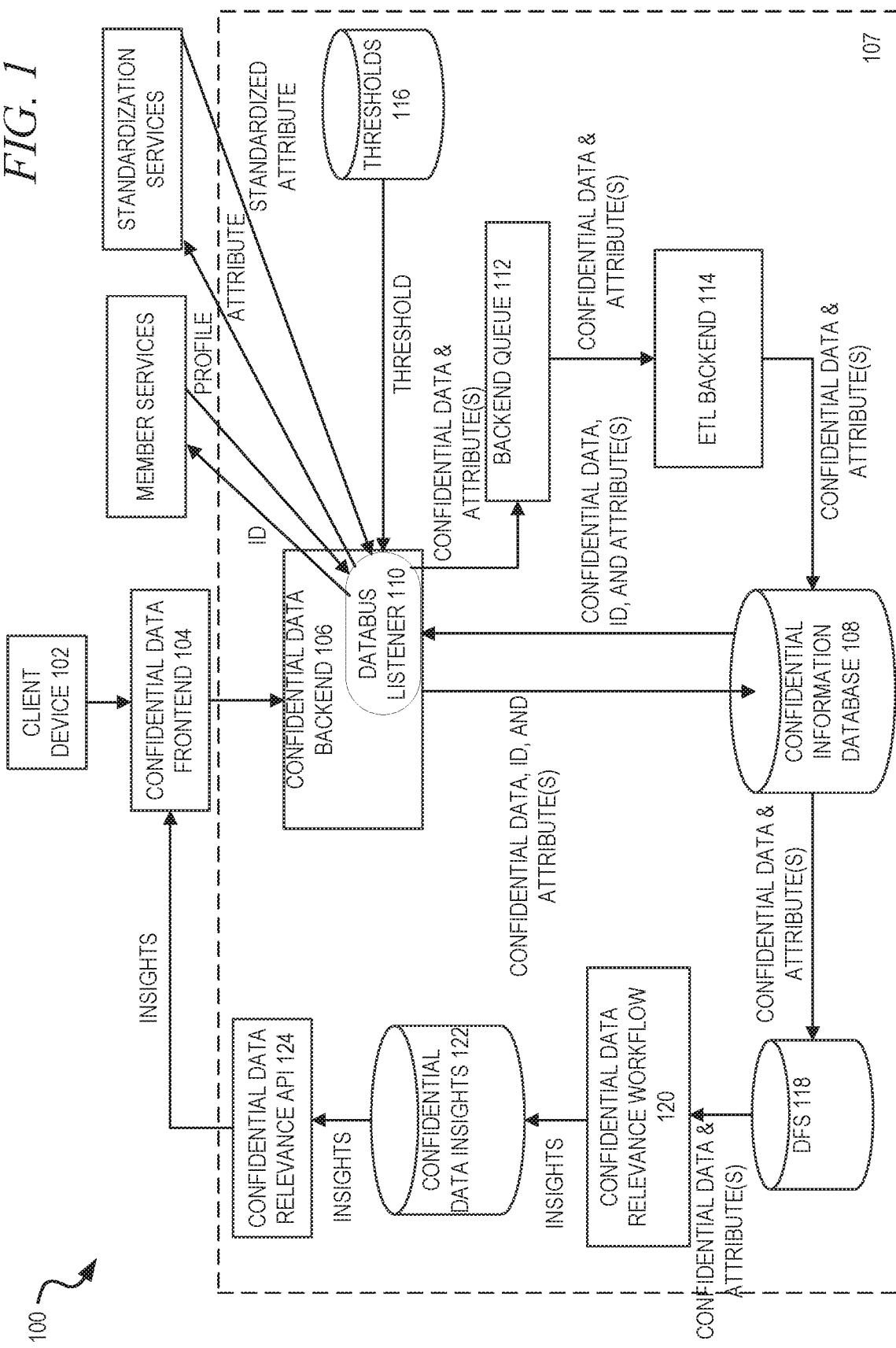
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to Hypertext Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user or as part of a feed section of the user's online service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the online service to alter feeds of, users in a manner that allows the users to select the link to launch the confidential data frontend 104.

In another example embodiment, the confidential data frontend 104 may be built into an application installed on the client device 102, such as a standalone application running on a smartphone. This confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a online service) to the confidential data backend 106. In an example embodiment, this may be performed via, for example, a REST Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns, such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes, may need to be satisfied in order to receive the insights, such as particular demographic or profile-based attributes. These attributes can include any such attribute, from location, title, to level of skill, to online service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a online service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data point. As will be described in more detail later, these thresholds may be created on a per-slice basis. Each slice may define a segment of users about which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a online service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is deidentified. In an example embodiment, no identification of the users who submitted the confidential data is provided to the backend queue 112. Indeed, in some example embodiments, the information provided to the backend queue 112 may simply be the confidential data itself and any information needed in order to properly group the confidential data into one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be transgressed at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location from where it was stored in non-deidentified form. It should be noted that in some example embodiments, the anonymization described above with respect to the databus listener 110 may actually be performed by the ETL backend 114. For example, the databus listener 110 may send non-deidentified confidential data along with all attributes to the backend queue 112, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the deidentified confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
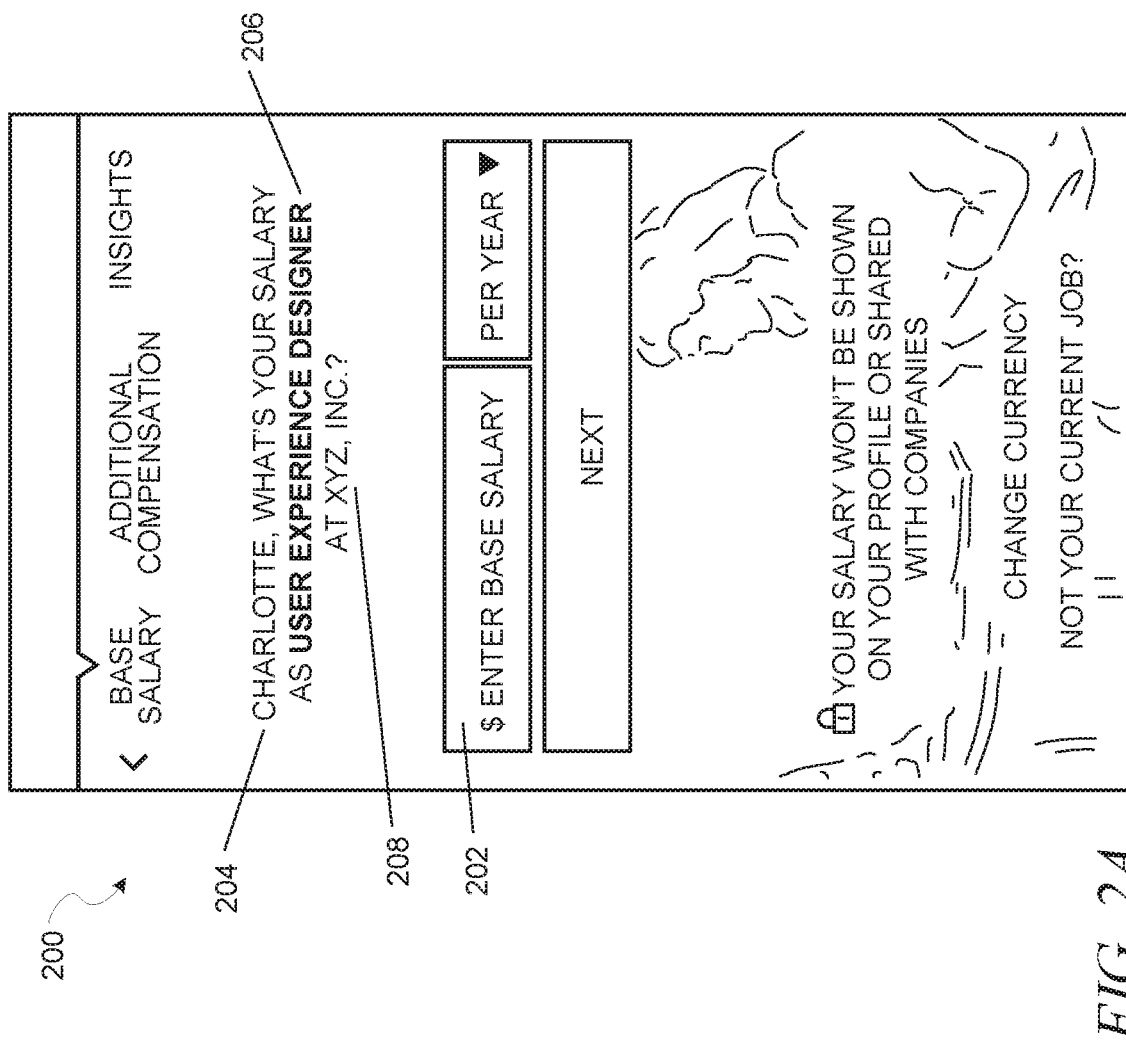
FIGS. 2A-2C are screen captures illustrating an example of a user interface provided by a confidential data frontend, in accordance with an example embodiment.
Figure 2B:
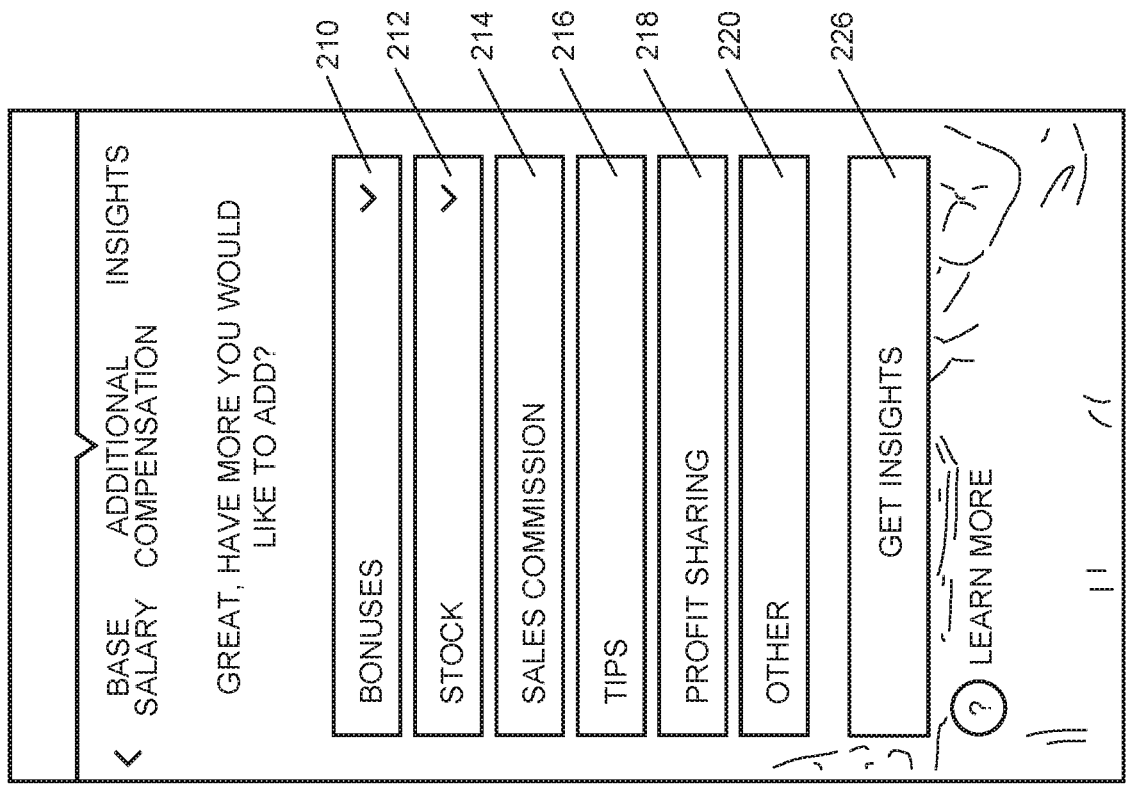
Figure 2C:
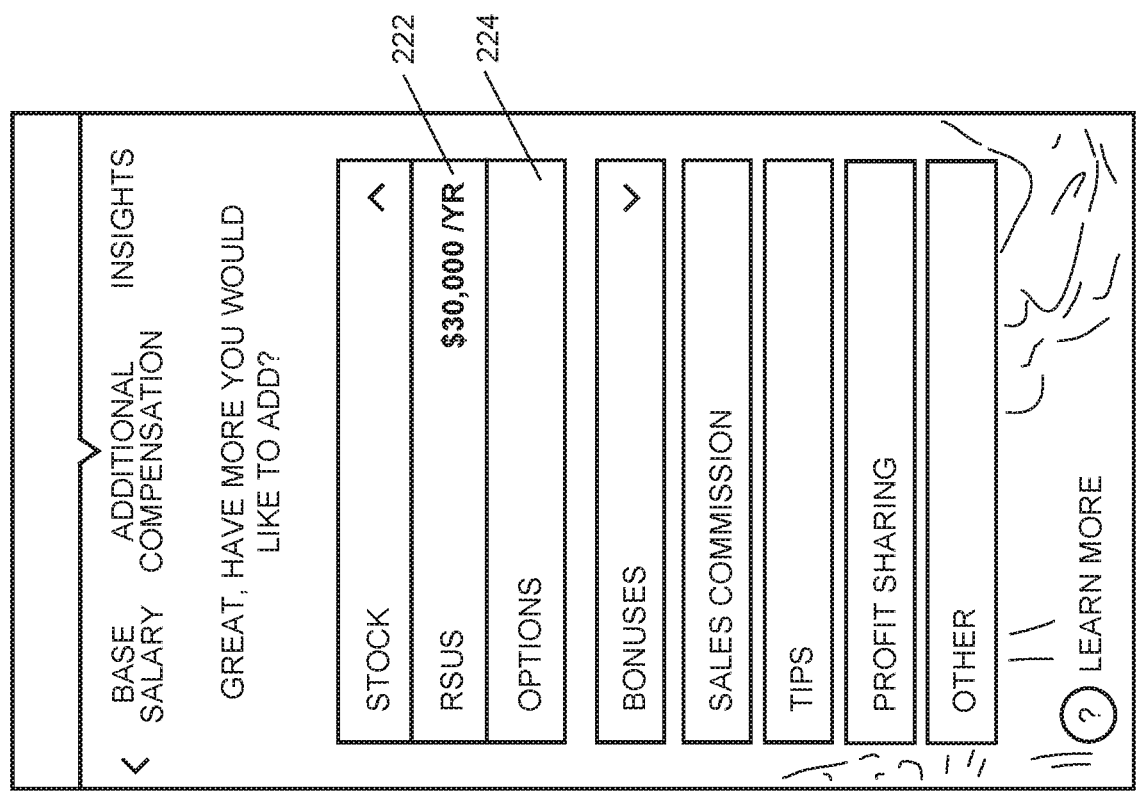

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods on which to measure the base salary (e.g., per year, per month, per hour, etc.). Additionally, the user may be identified by name at 204, the user's title may be identified at 206, and the user's current employer may be identified at 208. This information may be pre-populated into the user interface 200, such as by retrieving this information from a member profile for the user in a online service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
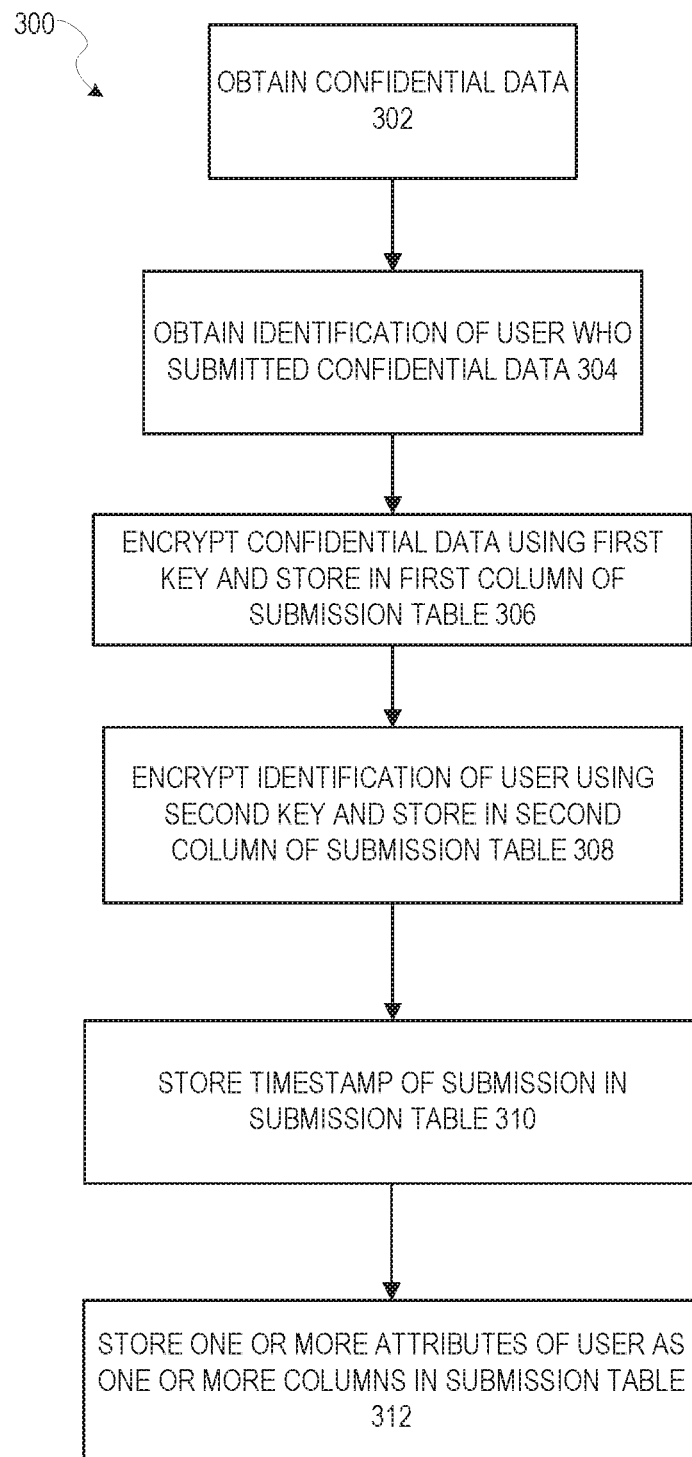
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, they may be performed in the same operation in some example embodiments. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a online service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
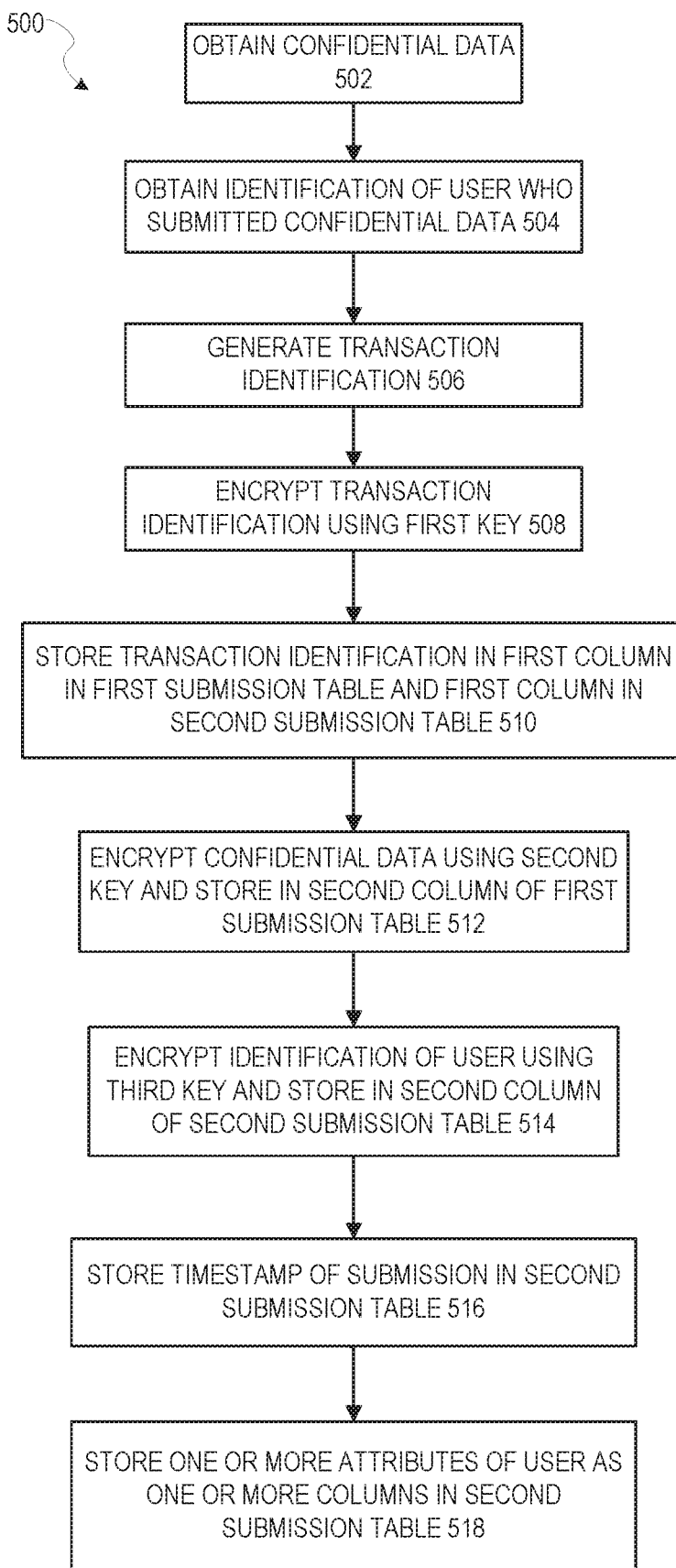
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

FIG. 6 is a diagram illustrating an example of a first submission table 600 and a second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by the first key is stored. In a second column 610, identification of the user who submitted the corresponding confidential data, encrypted by a third key, is stored. In a third column 612, a timestamp for the submission is stored. In a fourth column 614, a first attribute of the user (here location) is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

As described above, there is a need to handle situations where confidential data for certain combinations of cohorts, such as certain combinations of organizations and locations/job titles, are sparse.

In an example embodiment, information in a online service is mined to generate a novel, semantic representation (embedding) of organizations. Organization embeddings are learned from transition data (i.e., information about users who transitioned from one organization to another). Pairwise similarity values between organizations can then be computed based on these embeddings.

It should be noted that while in one embodiment these pairwise similarity values can be used to infer confidential data values, as described in more detail below, they can also be used in other scenarios, such as to display the set of organizations most similar to a given organization as part of an organization profile in the online service; perform audience expansion in advertising by showing ads not just to members of a particular organization but also to members from similar organizations; generate large candidate sets for "organization queries" with insufficient results in searches to users, by expanding the result to include similar organizations; and may be used as a feature in various search or recommendation systems.

For purposes of this solution, two organizations are considered to be similar if employees are very likely to move from one organization to the other. The notion of a peer score between two companies is formally defined. An algorithm, called Company2vec, may then be used to learn company embeddings from transition data, which uses techniques such as negative sampling and stochastic gradient descent to map each organization to its latent representations. From these embeddings, the peer scores may then be computed.

Two organizations u and v are considered peers if organization v is among top choices for employees in organization u to transition to and vice versa. Similarity between organizations u and v is then measured via peer score, defined as follows:

$$ps(u, v) := \frac{P(c_1 = v \mid c_0 = u)}{\max_w P(c_1 = w \mid c_0 = u)} \cdot \frac{P(c_1 = u \mid c_0 = v)}{\max_w P(c_1 = w \mid c_0 = v)}$$

where $c_0$ denotes the organization prior to the transition, $c_1$ denotes the organization after the transition, and $P(c_1=v|c_0=u)$ is thus the probability of a user to transition to organization v conditioned on the current organization being u. Peer score, ps (u,v), has a range of (0:1), and reaches its maximum 1 if companies u and v are each other's top transition choice, i.e., $$v = \arg\max_w P(c_1 = w \mid c_0 = u)$$
$$u = \arg\max_w P(c_1 = w \mid c_0 = v)$$

Without loss of generality, $P(c_1=v|c_0=u)$ is henceforth denoted as $P(v|u)$.

For each user of a online service, the user's work experiences can be arranged into a list of organization transitions in time order, and these transitions can be used as positive samples in training. For example, if a user lists consecutive work experiences in companies A, B, and C, then the company A to B transition and the B to C transition are marked as positive in training.

Negative sampling can also be applied to approximately estimate the transition probability and calculate a defined peer score. Here, each organization u is mapped to its embeddings, including $\phi_u$ in the latent transition origin space $\Phi \cup \mathbb{R}^n$ and $\psi_u$ in the latent transition destination space $\Psi \subset \mathbb{R}^m$. For each organization u, K organizations not sharing any transition with organization u can be randomly retrieved as negative samples, and the transition probability can be calculated as follows:

$$P(v \mid u) = \sigma(\phi_u^T \psi_v) \prod_{k=1}^{K} \sigma(-\phi_u^T \psi_{w_k(u)}),$$

where $\sigma(x)=1/(1+\exp(-x))$ is the sigmoid function, and $N_u:=\{w_1(u), w_2(u), \ldots, w_K(u)\}$ denotes the set of K randomly sampled negative companies of company u. Latent space dimension m and negative sample size K are two parameters to be chosen empirically based on the data size.

With the embeddings, the peer organization score can be approximately computed by randomly marginalizing out the denominator as:

$$ps(u, v) \approx \frac{\sigma(\phi_u^T \psi_v)}{\max_w \sigma(\phi_u^T \psi_w)} \cdot \frac{\sigma(\phi_v^T \psi_u)}{\max_w \sigma(\phi_v^T \psi_w)}.$$

The problem can then be interpreted as an optimization problem of learning latent transition origin embeddings $\Phi_C=\{\phi_u:u\in C\}$ and destination embeddings $\psi_C=\{\psi_u:u\in C\}$ for all companies C with objective function as the log likelihood of all pairs of transitions $\mathcal{T}$.

$$\sum_{(u,v)\in T} \sum_{\substack{z \in \\ \{v\}\cup N_u}} \{1_{\{z=v\}} \cdot \log[\sigma(\phi_u^T \psi_z)] + (1 - 1_{\{z=v\}}) \cdot \log[1 - \sigma(\phi_u^T \psi_z)]\}.$$

This optimization problem can be solved by stochastic gradient descent (SGD) and iterating between updating origin and destination embeddings until convergence. With a chosen learning rate n in SGD, the pseudocode for origin embedding $\phi_u$ for each positive ordered transition pair (u,v) given destination embeddings of the destination v and all negative samples as input, is shown below:
input: $\{\psi_z : z \in \{v\} \cup N_u\}$, i.e., destination embeddings of the positive destination company v and all negative samples in $N_u$.

```
output: φ_u, i.e., origin embedding of company u.
procedure UPDATE(φ_u)
    e ← 0                          * Initiate e to be 0
    for z ∈ {v} ∪ N_u do
        g ← η · [1_{z=v} − σ(φ_u^T ψ_z)]
        e ← e + g · ψ_z
        ψ_z ← ψ_z + g · φ_u
        φ_u ← φ_u + e
    end for
end procedure
```

As described briefly above, a second aspect may be the formation of peer organization groups using the peer scores. Specifically, in one example embodiment, a matrix of organization-organization peer scores can be generated and matrix factorization, such as singular value decomposition (SVD) or L-U decomposition may be performed to generate peer organization group clusters. In another example embodiment, for a first organization, peer scores for all other companies are computed and ranked. A number of the top ranked peer companies are then considered to be in the set of peer organizations. This set of top ranked peer companies may be selected based on a preset number of organizations (e.g., the top 5 organizations are selected as peers) or in comparison to a threshold (e.g., all organizations having a peer score above X are selected as peers).

In another example embodiment, organizations are partitioned by a combination of one or more of industry, location, title, or function, and matrix factorization analysis is performed separately over each partition in order to obtain the peer organization groups.

In another example embodiment, unsupervised classification and clustering methods, such as K-means clustering and Gaussian Process classification, are used to generate peer company groups.

In another example embodiment, the appropriate matrix of peer scores is analyzed to generate peer organization groups at the level of (organization, title, region), (organization, title), and (organization, region). Alternatively, (peer organization, super title) groups may be formed by analyzing the matrix of peer scores, and the generated groups are used as parent cohorts to smooth peer organization groups at the title level (i.e., (peer organization, title)).

These techniques may be applied, either individually or in various combinations, to output clusters of peer organizations or to output specific lists for individual organizations.

Figure 7:
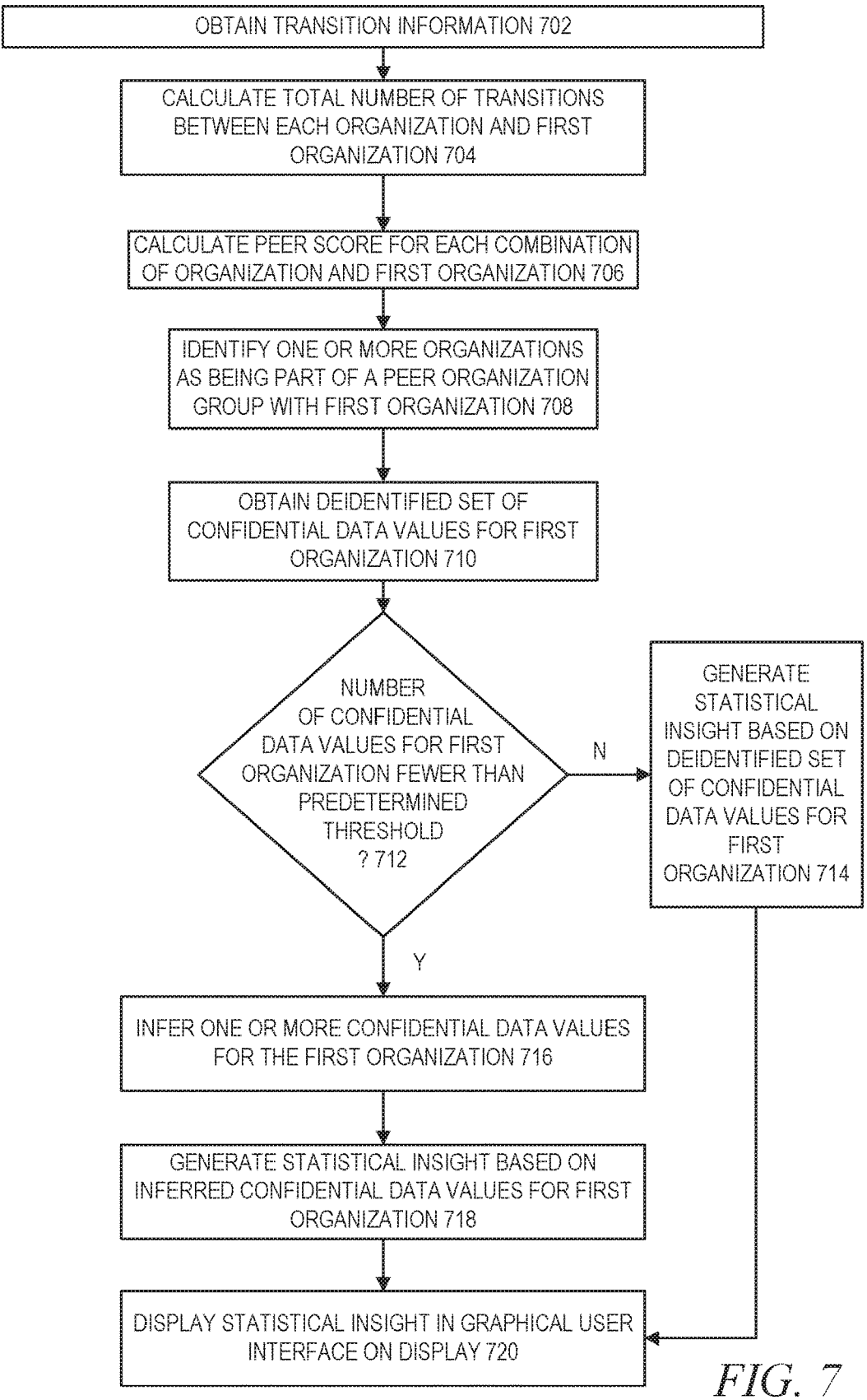
FIG. 7 is a flow diagram illustrating a method, in accordance with an example embodiment.

FIG. 7 is a flow diagram illustrating a method 700, in accordance with an example embodiment. At operation 702, information about transitions made by employees of a first organization to another organization or from another organization to the first organization is obtained. At operation 704, for each particular organization of a plurality of organizations other than the first organization, a total number of transitions between the particular organization and the first organization is calculated.

At operation 706, for each of a plurality of combinations of the first organization and a different particular organization in the plurality of organizations other than the first organization, a peer score is calculated based on the total number of transitions between the particular organization and the first organization. At operation 708, one or more of the different particular organizations that are part of a peer organization group with the first organization are identified based on the calculated peer scores.

At operation 710, an deidentified set of confidential data values is obtained for the first organization. At operation 712, it is determined whether the deidentified set of confidential data values for the first organization contains fewer values than a predetermined threshold for providing a statistical insight. If not, then at operation 714 a statistical insight can be generated for the first organization based on the deidentified set of confidential data values for the first organization. If so, then at operation 716, one or more confidential data values for the first organization are inferred using one or more confidential data values for one or more organizations, other than the first organization, in the peer organization group. Then at operation 718, a statistical insight is generated based on the inferred one or more confidential data values.

At operation 720, the statistical insight may be displayed in a graphical user interface (GUI) rendered on a display.

Figure 8:
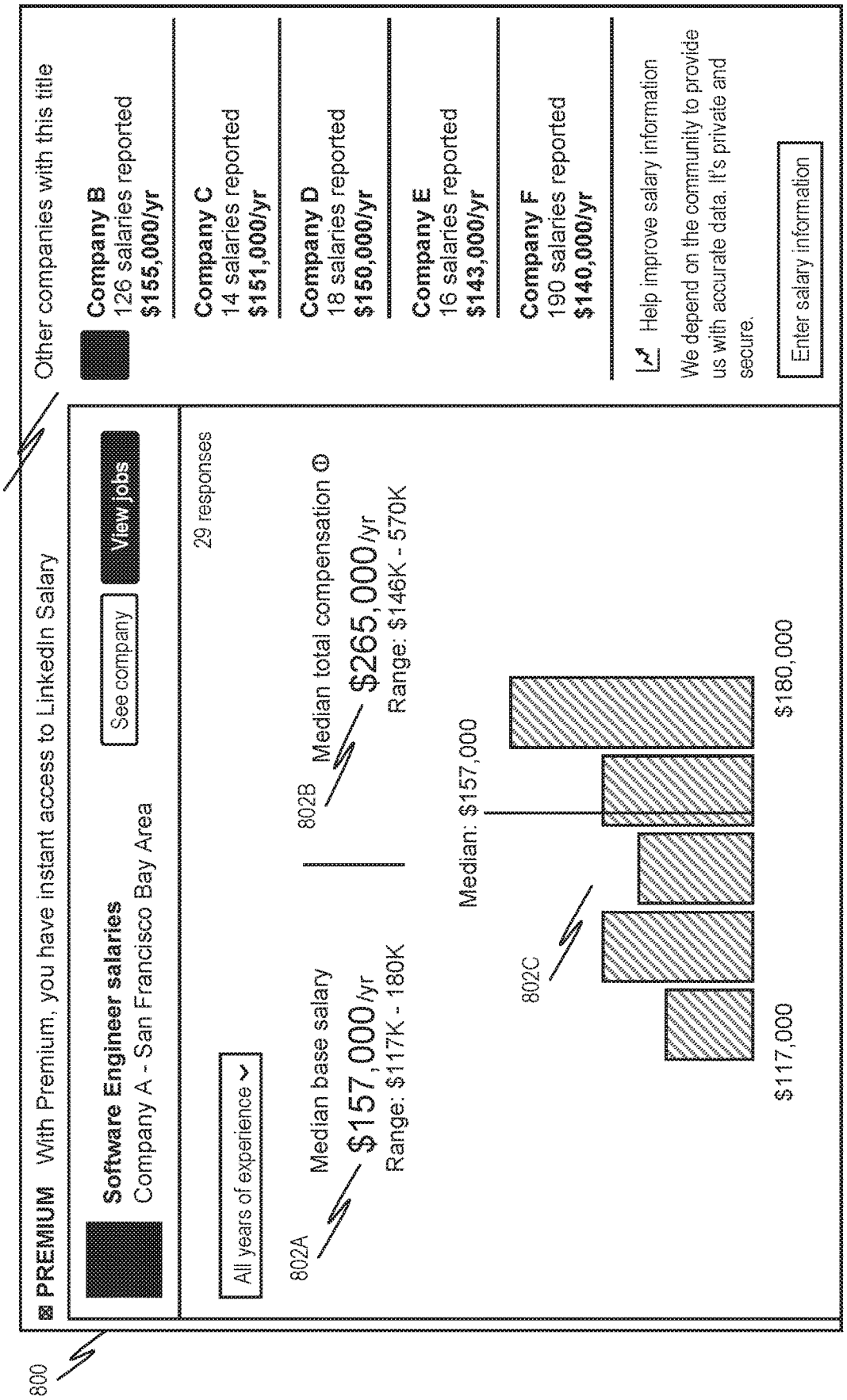
FIG. 8 is a screen capture illustrating an organization confidential data social networking profile page, in accordance with an example embodiment.

FIG. 8 is a screen capture illustrating an organization confidential data social networking profile page 800, in accordance with an example embodiment. Here, the organization confidential data social networking profile page 800 includes one or more statistical insights 802A, 802B, 802B garnered from submitted confidential data as described above. Also displayed is an organization peer group 804 including a list of peer organizations as well as brief statistical insights about each, also garnered from the submitted confidential data.

It should be noted that the statistical insights 802A-802C, as well as the statistical insights in the organization peer group 804, may rely on inferences based on confidential data about other organizations in the organization peer group, as described in more detail earlier, especially in cases where there is a lack of actual confidential data to directly make the corresponding insight. For example, the statistical insights 802A-802C may rely on an inference from confidential data about one or more of the organizations in the organization peer group because there are not enough submitted salary or compensation confidential data values explicitly for company A in order to make the insight.

Figure 9:
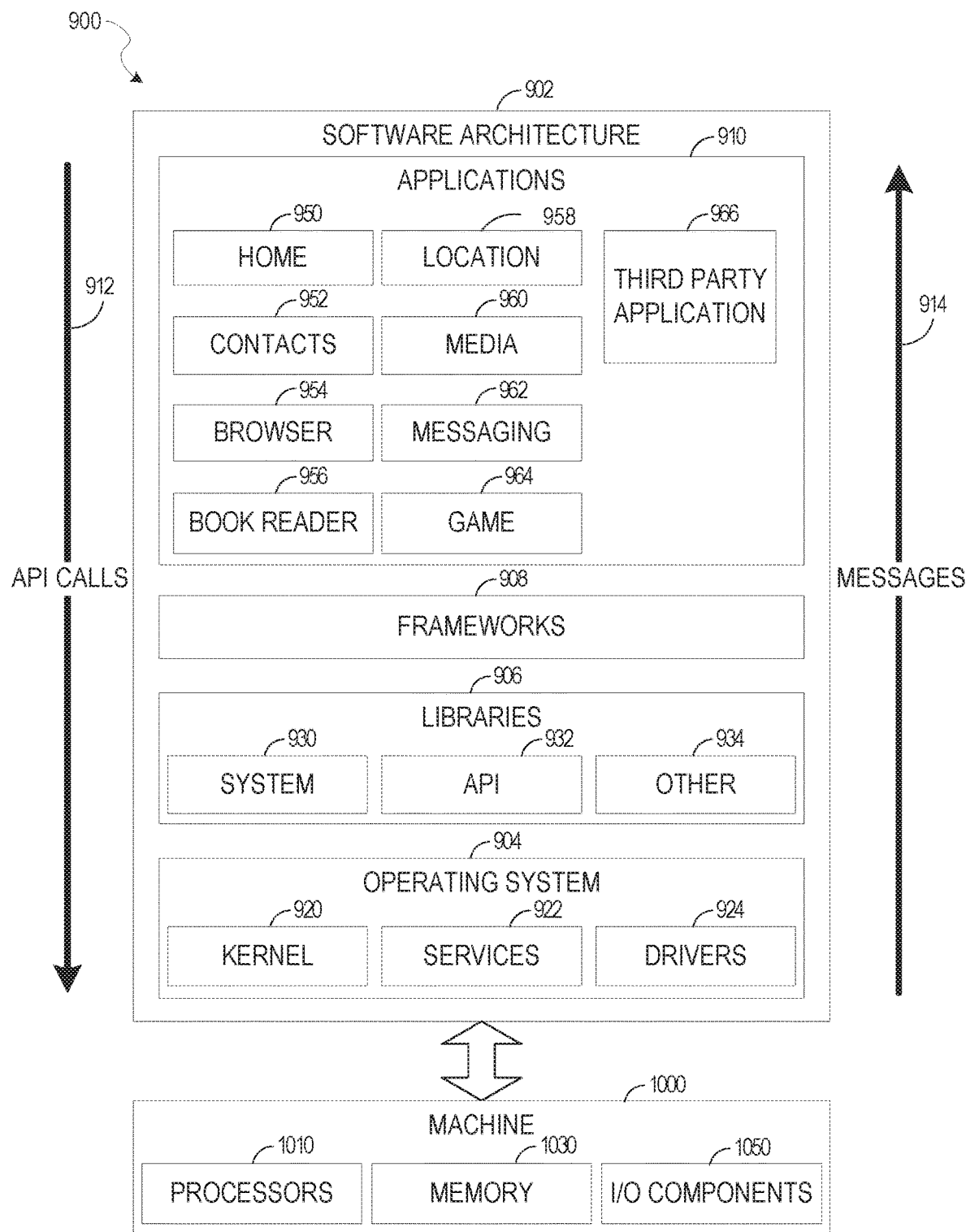
FIG. 9 is a block diagram illustrating a representative software architecture, which may be used in conjunction with various hardware architectures herein described.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various GUI functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
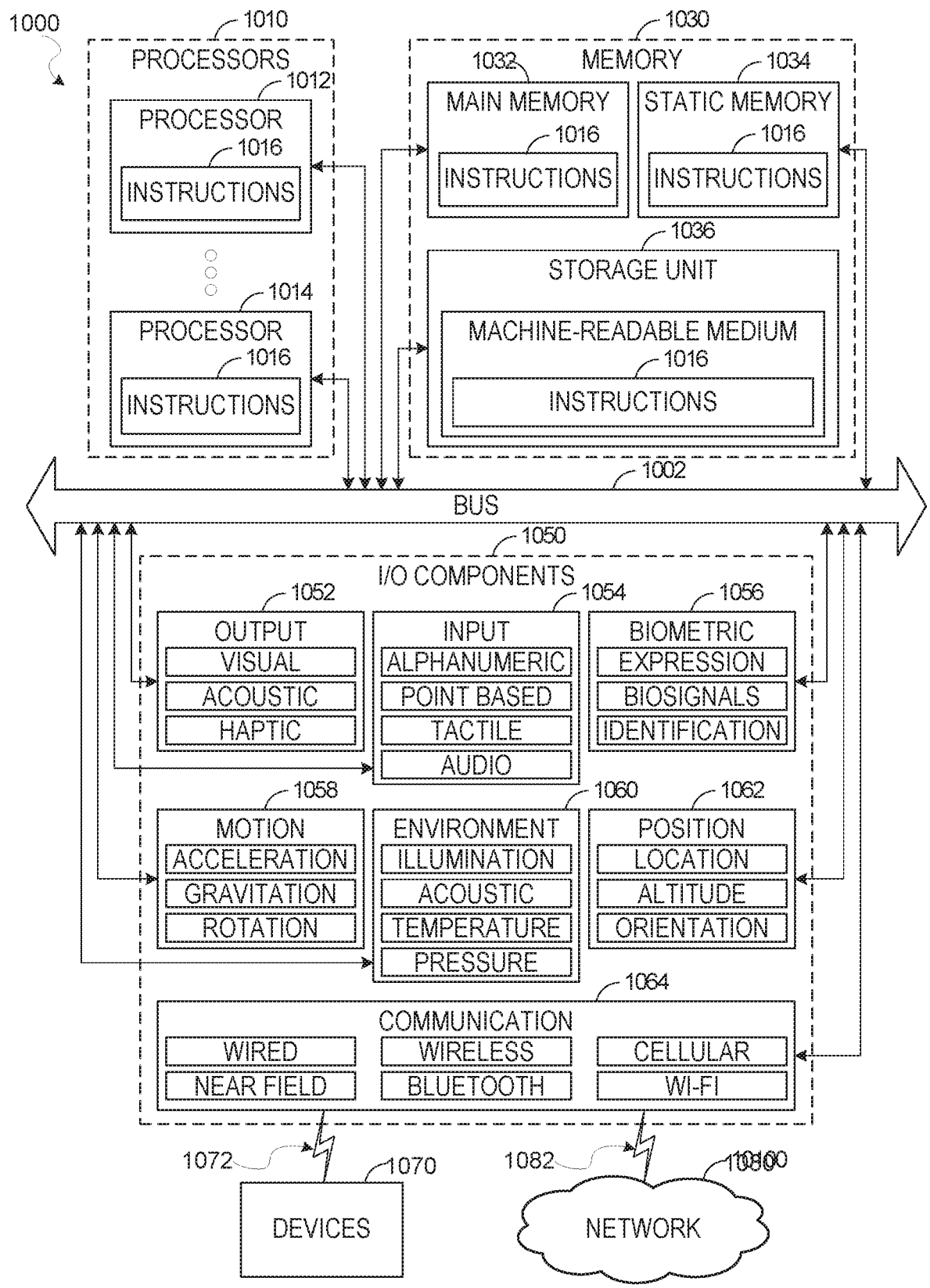
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein may be executed. For example, the instructions 1016 may cause the machine 1000 to execute the method 600 of FIG. 6. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or the storage unit 1036 may store one or more sets of instructions 916 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to the processors 1010. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a non-transitory computer-readable medium having instructions stored thereon, which, when executed by a processor, cause the system to:
obtain, via one or more graphical user interface, a plurality of electronic data submissions, each electronic data submission having user identification information and a corresponding confidential data value;
store each of the electronic data submissions in a row of a submission table by encrypting the user identification information using a first cryptographic key and storing the encrypted user identification information in a first column of the submission table, and encrypting the confidential data value using a second cryptographic key different than the first cryptographic key and storing the encrypted confidential data value in a second column of the submission table, thereby deidentifying the confidential data values;
obtain, for a first organization, information about transitions made by employees of the first organization to another organization or from another organization to the first organization;
calculate, for a particular organization of a plurality of organizations other than the first organization, a total number of transitions between the particular organization and the first organization;
for a combination of the first organization and the particular organization in the plurality of organizations other than the first organization, calculate a peer score based on the total number of transitions between the particular organization and the first organization;
identify the particular organization as part of a peer organization group with the first organization based on the calculated peer scores;
obtain a deidentified set of confidential data values for the first organization using the submission table;
determine that the deidentified set of confidential data values for the first organization contains fewer values than a predetermined threshold for providing a statistical insight;
in response to the determining, infer one or more confidential data values for the first organization using one or more confidential data values for one or more organizations, other than the first organization, in the peer organization group;
calculate a statistical insight based on the inferred one or more confidential data values; and
cause display of the statistical insight in a graphical user interface rendered on a display.

2. The system of claim 1, wherein the calculating the peer score includes using negative sampling by randomly retrieving information about organizations not having any employees with transitions to or from the first organization.

3. The system of claim 1, wherein the identifying comprises:
generating a matrix of organization-organization peer scores; and
using matrix factorization to generate organization group clusters.

4. The system of claim 1, wherein the identifying comprises:
generating a matrix of organization-organization peer scores; and
using K-means clustering to generate organization group clusters.

5. The system of claim 1; wherein the identifying comprises:
generating a matrix of organization-organization peer scores; and
using Gaussian Process classification to generate organization group clusters.

6. The system of claim 1, wherein the identifying comprises:
selecting a preset number of organizations having highest peer scores for the first organization for inclusion in the peer organization group.

7. The system of claim 1, wherein the identifying comprises:
selecting organizations having peer scores for the first organization exceeding a predetermined threshold for inclusion in the peer organization group.

8. A computerized method, comprising:
obtaining, via one or more graphical user interface, a plurality of electronic data submissions, each electronic data submission having user identification information and a corresponding confidential data value;
storing each of the electronic data submissions in a row of a submission table by encrypting the user identification information using a first cryptographic key and storing the encrypted user identification information in a first column of the submission table, and encrypting the confidential data value using a second cryptographic key different than the first cryptographic key and storing the encrypted confidential data value in a second column of the submission table, thereby deidentifying the confidential data values;
obtaining, for a first organization, information about transitions made by employees of the first organization to another organization or from another organization to the first organization;
calculating, for a particular organization of a plurality of organizations other than the first organization, a total number of transitions between the particular organization and the first organization;
for a combination of the first organization and the particular organization in the plurality of organizations other than the first organization, calculating a peer score based on the total number of transitions between the particular organization and the first organization;
identifying the particular organization as part of a peer organization group with the first organization based on the calculated peer scores;
obtaining a deidentified set of confidential data values for the first organization using the submission table;
determining that the deidentified set of confidential data values for the first organization contains fewer values than a predetermined threshold for providing a statistical insight;
in response to the determining, inferring one or more confidential data values for the first organization using one or more confidential data values for one or more organizations, other than the first organization, in the peer organization group;

calculating a statistical insight based on the inferred one or more confidential data values; and causing display of the statistical insight in a graphical user interface rendered on a display.

9. The method of claim 8, wherein the calculating the peer score includes using negative sampling by randomly retrieving information about organizations not having any employees with transitions to or from the first organization.

10. The method of claim 8, wherein the identifying comprises:
generating a matrix of organization-organization peer scores; and
using matrix factorization to generate organization group clusters.

11. The method of claim 8, wherein the identifying comprises:
generating a matrix of organization-organization peer scores; and
using K-means clustering to generate organization group clusters.

12. The method of claim 8, wherein the identifying comprises:
generating a matrix of organization-organization peer scores; and
using Gaussian Process classification to generate organization group clusters.

13. The method of claim 8, wherein the identifying comprises:
selecting a preset number of organizations having highest peer scores for the first organization for inclusion in the peer organization group.

14. The method of claim 8, wherein the identifying comprises:
selecting organizations having peer scores for the first organization exceeding a predetermined threshold for inclusion in the peer organization group.

15. A non-transitory machine-readable storage medium comprising instructions, which when implemented by one or more machines, cause the one or more machines to perform operations comprising:
obtaining, via one or more graphical user interface, a plurality of electronic data submissions, each electronic data submission having user identification information and a corresponding confidential data value;
storing each of the electronic data submissions in a row of a submission table by encrypting the user identification information using a first cryptographic key and storing the encrypted user identification information in a first column of the submission table, and encrypting the confidential data value using a second cryptographic key different than the first cryptographic key and storing the encrypted confidential data value in a second column of the submission table, thereby deidentifying the confidential data values;
obtaining, for a first organization, information about transitions made by employees of the first organization to another organization or from another organization to the first organization;
calculating, for a particular organization of a plurality of organizations other than the first organization, a total number of transitions between the particular organization and the first organization;
for a combination of the first organization and the particular organization in the plurality of organizations other than the first organization, calculating a peer score based on the total number of transitions between the particular organization and the first organization;
identifying the particular organization as part of a peer organization group with the first organization based on the calculated peer scores;
obtaining a deidentified set of confidential data values for the first organization using the submission table;
determining that the deidentified set of confidential data values for the first organization contains fewer values than a predetermined threshold for providing a statistical insight;
in response to the determining, inferring one or more confidential data values for the first organization using one or more confidential data values for one or more organizations, other than the first organization, in the peer organization group;
calculating a statistical insight based on the inferred one or more confidential data values; and
causing display of the statistical insight in a graphical user interface rendered on a display.

16. The non-transitory machine-readable storage medium of claim 15, wherein the calculating the peer score includes using negative sampling by randomly retrieving information about organizations not having any employees with transitions to or from the first organization.

17. The non-transitory machine-readable storage medium of claim 15, wherein the identifying comprises:
generating a matrix of organization-organization peer scores; and
using matrix factorization to generate organization group dusters.

18. The non-transitory machine-readable storage medium of claim 15, wherein the identifying comprises:
generating a matrix of organization-organization peer scores; and
using K-means clustering to generate organization group clusters.

19. The non-transitory machine-readable storage medium of claim 15, wherein the identifying comprises:
generating a matrix of organization-organization peer scores; and
using Gaussian Process classification to generate organization group clusters.

20. The non-transitory machine-readable storage medium of claim 15, wherein the identifying comprises:
selecting a preset of number organizations having highest peer scores for the first organization for inclusion in the peer organization group.

* * * * *

UNITED STATES PATENT AND TRADEMARK OFFICE
CERTIFICATE OF CORRECTION

PATENT NO. : 10,872,303 B2  
APPLICATION NO. : 15/994148  
DATED : December 22, 2020  
INVENTOR(S) : Yiqun Liu Page 1 of 1

It is certified that error appears in the above-identified patent and that said Letters Patent is hereby corrected as shown below:

In the Claims

In Column 20, Line 9, in Claim 5, delete "claim 1;" and insert --claim 1,-- therefor In Column 22, Line 39, in Claim 17, delete "dusters." and insert --clusters.-- therefor Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*